US005745175A

United States Patent [19]
Anderson

[11] Patent Number: 5,745,175
[45] Date of Patent: Apr. 28, 1998

[54] METHOD AND SYSTEM FOR PROVIDING AUTOMATIC FOCUS CONTROL FOR A STILL DIGITAL CAMERA

[75] Inventor: Eric C. Anderson, San Jose, Calif.

[73] Assignee: Flashpoint Technologies, Inc., San Jose, Calif.

[21] Appl. No.: 538,074

[22] Filed: Oct. 2, 1995

[51] Int. Cl.$^6$ ................................................. H04N 5/232
[52] U.S. Cl. .................................... 348/345; 348/362
[58] Field of Search ............................. 348/345, 349, 348/350, 362, 363, 364; 250/201.2; H04N 5/232, 5/235

[56] References Cited

U.S. PATENT DOCUMENTS

| | | |
|---|---|---|
| 4,969,045 | 11/1990 | Haruki et al. ............................ 348/349 |
| 5,093,716 | 3/1992 | Kondo et al. ............................ 348/349 |
| 5,369,461 | 11/1994 | Hirasawa et al. ........................ 396/135 |
| 5,604,537 | 2/1997 | Yamazaki et al. ....................... 348/350 |

*Primary Examiner*—Andrew Faile
*Assistant Examiner*—Tuan V. Ho
*Attorney, Agent, or Firm*—Sawyer & Associates

[57] ABSTRACT

A method and system for automatically focusing an image within a still camera is disclosed. The method and system comprises providing initial focus and exposure values of the image, calculating an exposure setting for the image, and determining a plurality of focus zones for the image. The method and system includes moving the lens through the plurality of focus zones of the image to obtain exposure and focus information about the image. Through a method and system in accordance with the present invention, a digital still camera can produce a three-dimensional like data set of a scene.

11 Claims, 7 Drawing Sheets

METHOD AND SYSTEM FOR PROVIDING AUTOMATIC FOCUS CONTROL FOR A STILL DIGITAL CAMERA

FIELD OF THE INVENTION

The present invention relates generally to electronic imaging systems such as digital cameras. In particular, the present invention relates to systems and methods for providing the user with information as to the portion of an image that is in focus.

BACKGROUND OF THE INVENTION

As cameras have developed from manual control to more and more complete automatic control, many methods of focus have been developed, with various levels of capability. A variety of still cameras are presently commercially available that include such features as an "automatic" focus lens. Such cameras with the automatic focus feature, automatically gather focusing information and adjust the lens of the camera to bring the image received by the camera at the moment the picture is taken into focus. Conventionally, such auto-focus cameras selected predetermined areas in the image to be captured as points that must be in focus. A particular problem with such auto-focus cameras is that they do not provide the user with any feedback or information as to the portions of the image that will be in focus when the picture is taken. Since the image is viewed through a false lens, the user must hope the portion of the image of importance is in focus when the picture is taken or hope that the portion of the image of importance falls within an area used by the auto focus mechanism.

For film-based still cameras, the "state of the art" is a "multi-beam" technology (multiple IR beams) or multiple spot focus technology, which senses more than one location in the image capture area to determine the "best" focus. The reason for using multiple points or spots comes from the failure of central spot focus from handling common situations, such as two people standing side by side in front of a wall. A "single beam" or single spot focus camera will typically focus on the wall rather than the people.

With multi-beam or multiple spot technology, common focus errors can be avoided. For example, with three focus spots, one in the center, and the other two on the left and right of center, you can detect that there are objects closer to the camera than indicated by the center spot. One simple algorithm is to focus on the closest object detected. Note, however, that this arrangement of sensing spots will not work if the camera is turned to take a portrait rather than landscape picture. In this case, the sensing spots may all fall on the wall between the two people being photographed.

The limitations of these cameras comes from the added cost of sensing more and more of the image. Also, as you add more sensors, computational requirements rise rapidly, and algorithmic complexity rises with it.

Even with cameras that allow the user to view the image to be captured through the current settings of the actual lens, such as a single lens reflex (SLR) camera or a digital camera with a live view finder, identifying the portions of the image that are in focus can be particularly problematic. The image to be captured is typically displayed in a view finder with the image significantly reduced in size. Moreover, the resolution and picture quality of such view finders is very poor.

Therefore, when viewing an image to be photographed or captured it is very difficult to identify the portions of the image that are in focus. Because of the poor resolution and small size of the images, in many instances it is not possible to determine the portions of the image that are in focus. This problem is even more significant for digital cameras since ideally, the user will view the image through the view finder for only a few seconds before deciding whether to take the picture, change the view or adjust the focus. Moreover, in the normal use of such cameras, it is very difficult for the user to determine the portion of the image that is in focus, especially when under pressure of the moment to get a picture. It is very common for users, even with SLR and digital cameras, to get out of focus pictures. Thus, there is need for a system that alerts the user as to the portion of the image that is in focus.

A variety of video cameras for capturing moving pictures of live scenes have been developed and their use is now widespread. Many existing video cameras provide for both the manual and the automatic focusing on images being filmed. Like digital cameras, video cameras typically provide a live view finder. These view finders are also very small, usually less than one square inch. They also suffer from the shortcoming of providing little feedback to the user as to what portions of the scene being filmed are in focus and what portions are not in focus.

Therefore, it is very difficult for the user to determine whether an image is satisfactorily in focus using the auto focus mechanisms of the video camera or whether the user should resort to manual adjustment to focus in on the portions of the image as desired. In many instances, the user must view the scene for a significant period of time to ensure that the objects of interest in the scene are in focus. For live action filming, this is a particular problem because the user is not able to quickly adjust the focus as desired to film objects in the scene of interest.

Both still and video cameras commonly include means for the automatic determination of camera exposure and focus settings. In the prior art, cameras that automatically determine exposure and focus settings typically include one or more sensors that detect light intensity in one or more measurement zones within an image and output a corresponding light intensity signal. Referring now to FIG. 1A, an exemplary set of measurement zones within an exemplary image is shown. As shown in FIG. 1A, the exemplary image contains a tree, the sky, and the ground. The exemplary set of measurement zones includes a first and a second measurement zone in which light is detected and measured, respectively labeled A and B. Each of the exemplary measurement zones corresponds to a predetermined region within the exemplary image. The positioning of the measurement zones and the use of the data produced from them is typically optimized for a standard upright orientation of the camera and portions of the image that are most-likely to be of interest. Those skilled in the art will readily recognize that the set of measurement zones can be identified in a different manner than that shown.

Prior art apparatus and methods typically perform predetermined setting calculations using predetermined weighted combinations of light intensity signals to generate exposure and focus settings. The predetermined setting calculations and the use of predetermined weighted combinations of light intensity signals are intended to produce optimum exposure and focus settings and are based upon several assumptions about an image. One assumption, by way of example, is that an image in the top portion will be brighter than the bottom portion of the image. In the exemplary image of FIG. 1A, the sky in the top portion of the exemplary image is indeed likely to be brighter than the ground in the bottom portion of the exemplary image. In a like manner, if an image contains a person or object positioned against a background, the top portion of the image, namely, that portion of the image containing the person's head, is likely to be brighter than the bottom portion of the image.

The predetermined setting calculations thus weight intensity signals generated by those sensors associated with the top portion of the image more strongly than intensity signals generated by the sensors associated with the bottom portion of the image. For example, the predetermined setting calculations might use 75% of the intensity signal obtained from measurement zone A in FIG. 1A, and 25% of the intensity signal obtained from measurement zone B to determine optimum settings for shutter speed, focus, and aperture. Other assumptions may be that the object in the center is the most important; that the object in the front is most important; that the largest object is most important. Making assumptions, however, does not adequately address the myriad of situations encountered when focusing a still camera for an image. What is desired therefore is a system and method that allows for more focus information concerning a scene to be obtained without adding undue expense and complexity to the camera.

Therefore, there is a need for a system and method for allowing a still camera to have more information about an image such that a more accurate picture can be taken. In particular, there is a need for a system and method that automatically focuses the image in an efficient manner. The present invention addresses such a need.

SUMMARY OF THE INVENTION

A method and system for automatically focusing an image within a still camera is disclosed. The method and system comprises providing initial focus and exposure values of the image, calculating an exposure setting for the image, and determining a plurality of focus zones for the image. The method and system includes moving the lens through the plurality of focus zones of the image to obtain exposure and focus information about the image.

Through a method and system in accordance with the present invention, a digital still camera can produce a three-dimensional like data set of a scene. In so doing, a picture can be obtained of the scene that is more focused and also has a better exposure overall than known cameras.

DETAILED DESCRIPTION OF THE INVENTION

The present invention relates to autofocusing of a still digital camera. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1A:
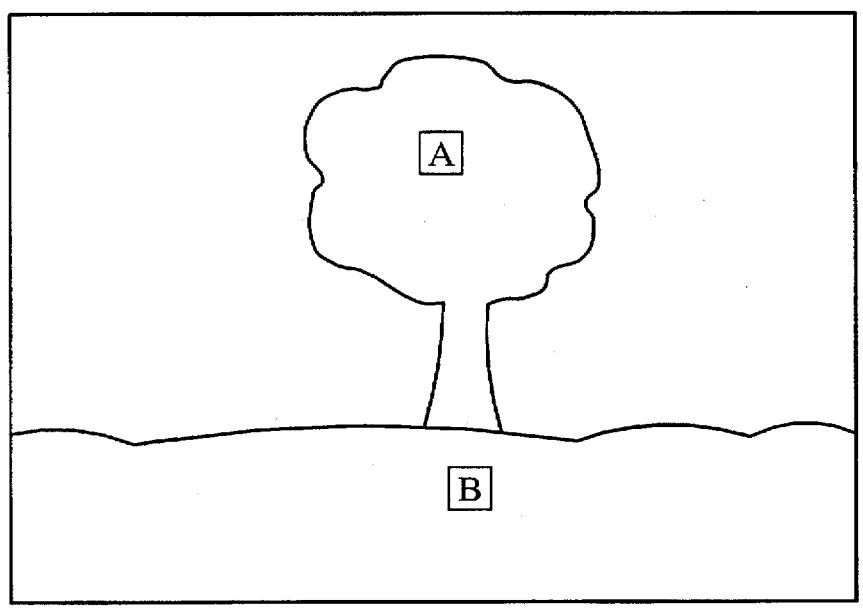
FIG. 1A is a graphical representation of an exemplary image and an exemplary set of measurement zones used by a camera in its normal orientation.
Figure 1:
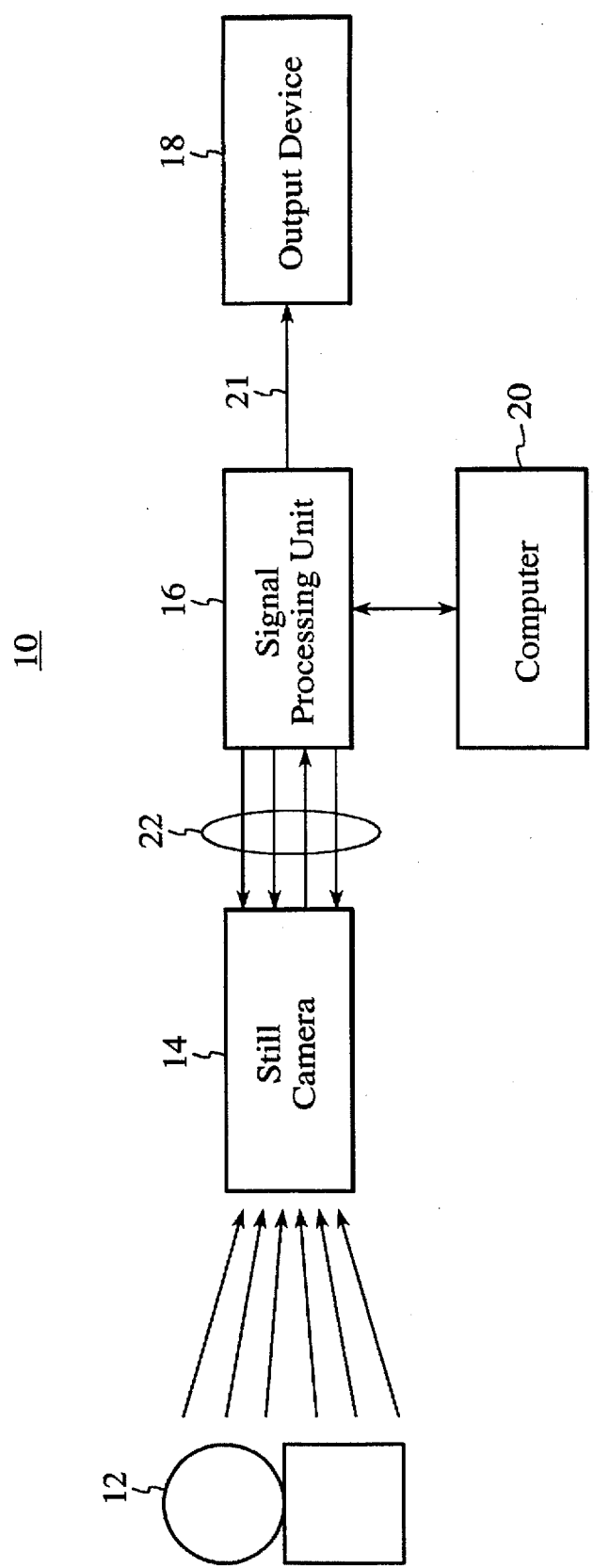
FIG. 1 is a block diagram of a preferred embodiment of the system of the present invention for generating an automatic focusing system control for a still digital camera.

Referring now to FIG. 1, a block diagram of a system 10 for providing an automatic focus control for a still digital camera is shown. The system 10 is used to capture an image of an exemplary object 12. The system 10 built in accordance with the present invention preferably comprises a still digital camera 14, a signal processing unit 16, an output device 18, a computer 20 and an electronic interface 22. An image is captured by the still digital camera 14, and the still digital camera 14 produces an electrical signal representing the image. The still digital camera 14 is coupled by the electronic interface 22 to the signal processing unit 16.

The electronic interface 22 is used by the still digital camera 14 to send signals representing images to the signal processing unit 16, and by the signal processing unit 16 for sending control signals back to the still digital camera 14. The signal processing unit 16 is coupled to the output device 18 by a line 21 for displaying to the user the image received by the still digital camera 14 and transformed by the signal processing unit 16. The output device 18 is preferably an active matrix, liquid crystal display, and produces a live viewfinder image. However, those skilled in the art will realize that the output 18 could be any variety of other types of conventional display devices such as a flat panel display or a CRT. The output device 18 may also include LEDs or other types of lights as status indicators. The signal processing unit 16 is also coupled to the computer 20 to store images gathered by the still digital camera 14 and for further processing and display of such images.

Figure 2:
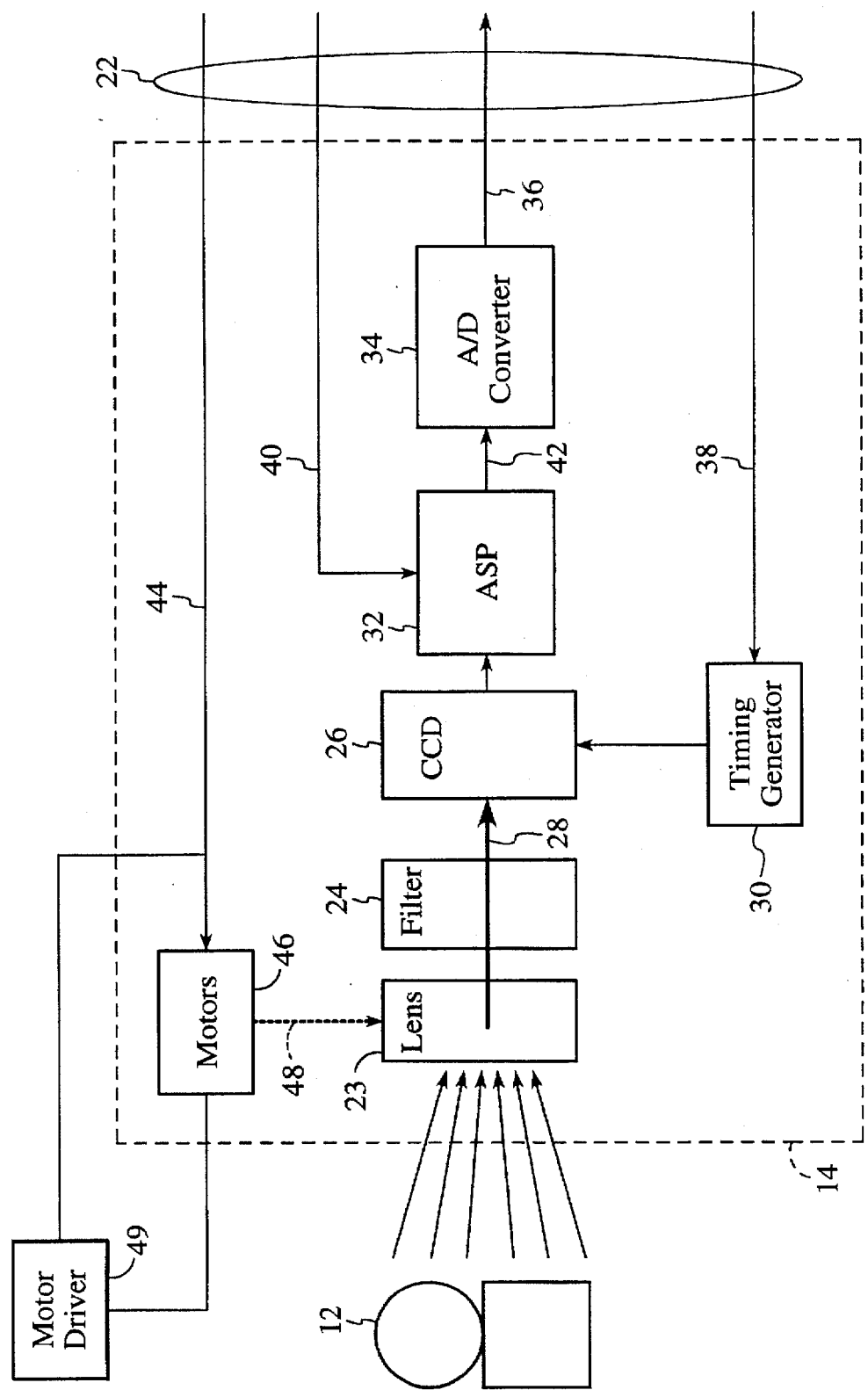
FIG. 2 is a block diagram of a preferred embodiment of the still digital camera of the present invention.

Referring now to FIG. 2, the still digital camera 14 is shown in more detail. The still digital camera 14 preferably comprises a lens 23 having an iris, a filter 24, an image sensor 26, a timing generator 30, an analog signal processor 32, an analog-to-digital (A/D) converter 34 and one or more motors 46. Light passes from the object 12 along an optical path 28 through the lens 23 and the filter 24 to the image sensor 26. The lens 23, the filter 24 and the image sensor 26 are preferably disposed in succession coaxially along the optical path 28.

The lens 23 is preferably a fixed focal length lens with movable lens group to allow autofocus, however, lens 23 could be any plurality of lens providing for adjustment to focus on different parts of the image received, as will be understood to those skilled in the art. The filter 24 preferably includes an infrared filter and an ultraviolet filter such that visible light is passed to the image sensor 26, while wavelengths of infrared and ultraviolet light are absorbed. The filter 24 may also include optical low and high pass filters of various wavelengths of visible light as known to those skilled in the art. Additionally, the filter 24 preferably includes a "color filter array" on the image sensor 26 for receiving a color image. Those skilled in the art will realize that alternatively, a beam splitter and 3 separate CCD sensors, one for each color, may be used.

The image sensor 26 is disposed in coaxial alignment with the optical path 28, and is positioned to receive filtered light containing image data from the filter 24. Filtered light is received by the image sensor 26 which is preferably a charge coupled device (CCD) that records image data as an array of analog voltages. It should be understood, however, that other devices, such as area sensors which are not CCD's are also possible and their use would be within the spirit and scope of the present invention. The image sensor 26 measures the illumination of the filtered light on a pixel by pixel basis, and outputs a two-dimensional array of corresponding analog voltages to the analog signal processor 32. The image sensor 26 is coupled to the timing generator and driver 30 that provides signals for reading out the analog voltages from the CCD 26.

The timing generator and driver 30 includes an internal clock and other control circuitry, that periodically directs the image sensor 26 to receive image data corresponding to the object 12 and output the data to the analog signal processor 32. The timing generator and driver 30 also has an input coupled to receive control signals on a line 38 of the electronic interface 22. The control signals applied to line 38 specify the exposure time and the modes of the sensor 26 (i.e., flush sensor in preparation for image capture, expose image, shift image data array, etc.).

These signals are used as in conventional video cameras to sample the image at a single, fixed rate (60/second for NTSC), or as in digital still cameras where the sampling rate can have several "rates" of capture, or can do it "one at a time". Also, the control signals provide for sub-sampled capture (such as every other line, or every other line pair, etc.) for collecting data to focus and set exposure, where basic image information is needed but the computational expense of gathering and processing full image data is not required.

The analog signal processor 32 has a data input, a control input and a data output. The data input is coupled to the output of the image sensor 26 to receive the image data. The control input is coupled to line 40 of the electronic interface 22 for receiving control signals to specify how the analog signal processor 32 will manipulate the image data received from the image sensor 26. One such control signal provides gain control for the signal processor 32 (AGC circuitry in DSP or computer feed back to set gain). The signal processor 32 is also coupled to the timing generator 30 through this output and dark level clamping is accomplished with appropriate pulses from the timing generator 30.

For example, typical operations that the analog signal processor 32 will perform include double correlated sampling (DCS), dark level clamping, level shifting, gain control, and other industry standard signal conditioning techniques designed to improve the quality of the data captured by the A/D. Once the image data has been processed by the analog signal processor 32, it is output on line 42. The output of the analog signal processor 32 is coupled by line 42 to the input of the A/D converter 34 to provide the analog image signals. The A/D converter 34 converts the analog voltages to corresponding digital values, on a pixel by pixel basis, and outputs the digital array on line 36 to the signal processing unit 16.

The still digital camera 14 also includes one or more motors 46 for controlling the position of the movable lens group 23 from the image sensor to focus, and to control the size of an iris that is part of the lens 23. In an exemplary embodiment, the motors 46 include a focus motor, an iris motor and a zoom motor. The exposure is adjusted by changing the exposure time (sampling rate of time generator 30), the ASP gain (gain of analog signal processor 32), and the iris (iris motor).

The focus of the image on the image sensor 26 is modified using the focus motor and any zooming is controlled by moving the lens 23 or some lens elements with respect to the image sensor 26 using the zoom motor. The motors 46 are preferably a conventional type known in the art. The motors 46 are coupled to line 44 to receive signals for controlling the focus motor, the iris motor and the zoom motor. For ease of understanding, the effect of the motors on the lens 23 that includes an iris is shown by the dashed line 48. A motor control/motor driver 44 is coupled to the motors 46. Typically, this control driver 44 is within the signal processing blocks 16 of FIG. 1.

Figure 3:
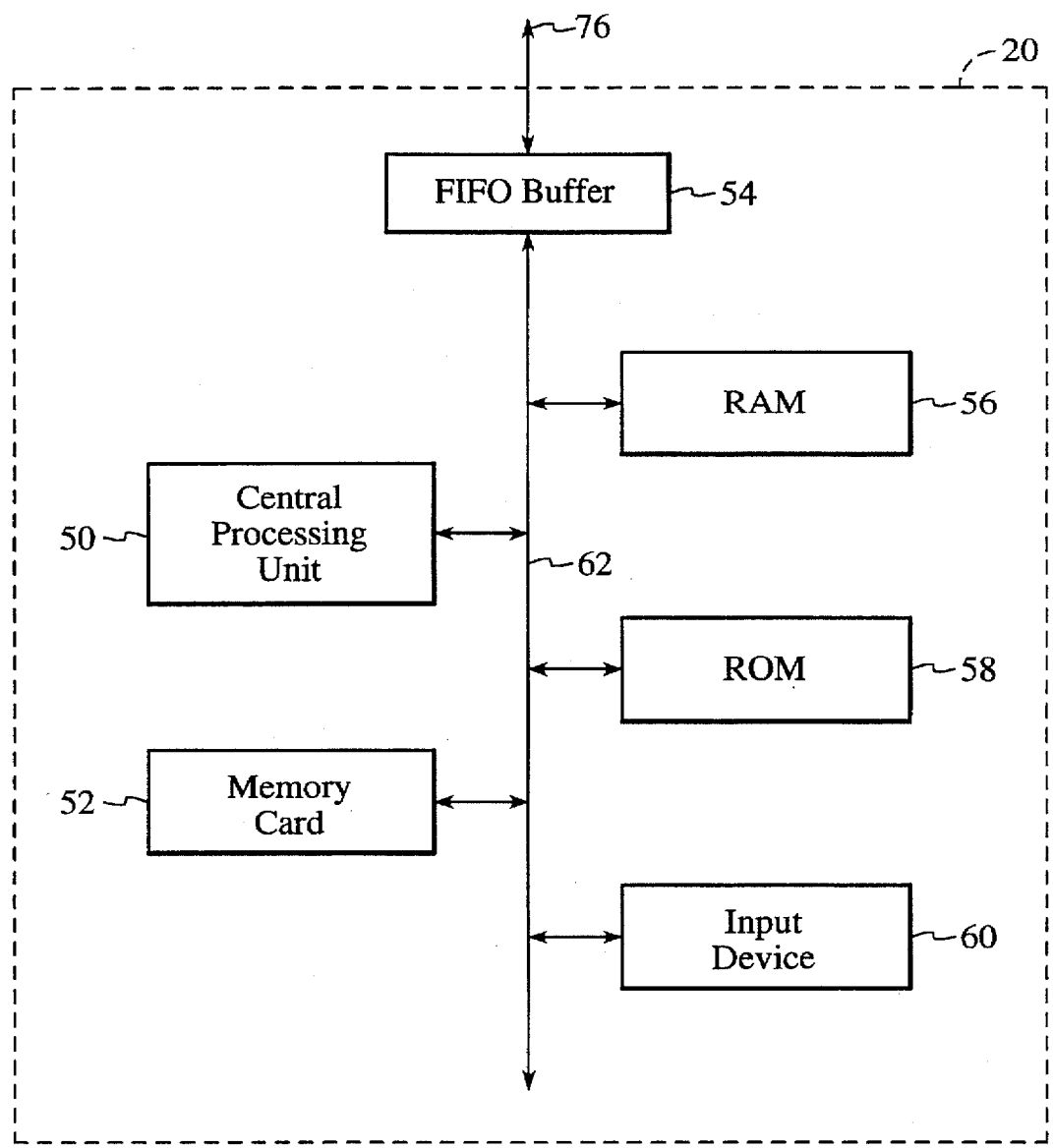
FIG. 3 is a block diagram of a preferred embodiment of a computer of the present invention.

Referring now to FIG. 3, the computer 20 is shown in more detail. The computer 20 preferably comprises a central processing unit (CPU) 50, a memory card 52, a buffer 54, random access memory (RAM) 56, read-only memory 58, and an input/output device 60. The central processing unit (CPU) 50, the memory card 52, the RAM 56, the ROM 58, and the input/output device 60 are coupled in a von Neuman architecture via a bus 62. In a first and preferred embodiment, the computer 20 is embedded as part of the system 10 similar to computers in digital cameras. The central processing unit 50 is preferably a microprocessor such as a Motorola 68040. The RAM 56 preferably forms a frame buffer and also includes work space for processing the image data. Additional memory may be provided through the use of the memory card 52, which preferably includes flash memory. The ROM 58 stores an operating system, start up information, programs for processing the raw data from the CCD 26 into first fully interpolated and color corrected images and then compressed images, and other predetermined routines.

The input/output device 60 is preferably a series of control buttons for selecting an operating mode for the output device 18 such as between normal view and focus assist view. Additional control buttons or mechanisms might also be included for adjusting the focus and other operating parameters of the still digital camera 14. For example, the input/output device 60 includes function buttons, such as shutter buttons, focus and zoom buttons, mode setting buttons, LCD panels, etc. These inputs are processed by the CPU 50 under direction and control of routines stored in RAM 56 and/or ROM 58, and the operating system stored in ROM 58. The CPU 50 generates control signals that are provided to the still digital camera 14 via line 76 through the signal processing unit 16 and the electronic interface 22.

The computer 20 is preferably coupled by line 76 to the signal processing unit 16. Via line 76, the computer 20 is able to receive image data for images captured and processed by the still digital camera and signal processing unit 16, respectively. The buffer 54 has inputs that are coupled to line 76. The outputs of the buffer 54 are coupled to the bus 62 for transmitting image data on the bus 62. The buffer 54 also provides for the transmission of control signals to the signal processing unit 16. For this application, the buffer 54 has inputs coupled to the bus and outputs coupled to line 76.

In a second and alternate embodiment, the computer 20 may be a desktop type computer. In such a case, the input/output device 60 also includes a keyboard and mouse type controller. In the second embodiment, the computer 20 is a Macintosh Quadra 800 computer. Those skilled in the art will realize that the computer 20 could also be implemented on an IBM personal computer. Those skilled in the art will further realize that the in the second and alternate embodiment the work space, programs and routines are stored in RAM as opposed to being stored in ROM in the embedded computer case (the preferred embodiment).

The present invention utilizes the ability of a digital camera to rapidly generate focus and exposure information for a single scene. With digital camera technology, however, it is possible to get much more information from the scene than is cost effective in a film camera. Fundamentally, this is due to the fact that the entire image area is sensed, normally by the charge coupled device. This information can be made available at a rapid rate (video rate, for example), and used to extract focus information.

In a typical video camera, this is in fact what is done. Typically, a portion of the signal is passed through a high-pass filter, and the lens is moved in such a way as to maximize the high frequency content. Normally, the central area of the image is used. A video camera has a very serious constraint, however. Since it is by definition a continuous recording device, it must react slowly and continuously to changing scenes, attempting to track movement and maintain focus on the primary subject. This limitation results in the video camera getting "stuck" in out of focus situations.

Figure 4:
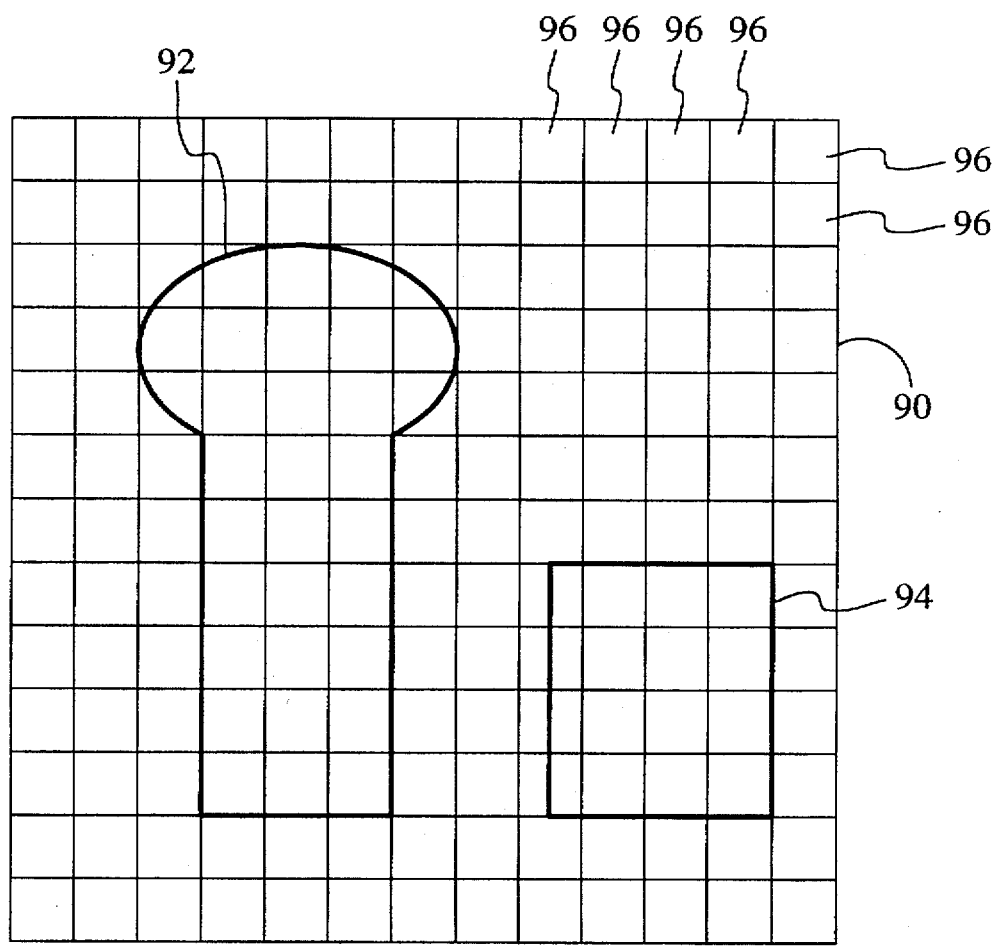
FIG. 4 is a graphical representation of an image that has been sectionalized in accordance with the present invention.

In a system and method in accordance with the present invention a measure of contrast and an average brightness level for each defined section of the image can be obtained. Referring now to FIG. 4, what is shown is a scene 90 that includes two objects 92 and 94 that have been sectionalized into an array of rectangles 96. In one example, an array of 8×12 (96 rectangles) would provide extensive information about an image. Each section would have a single value indicating contrast, plus 3 values indicating brightness level for the 3 colors. These values would be calculated from the pixels within each rectangle provided by data from the still digital camera 14. One of ordinary skill in the art readily recognizes that the algorithm for calculating the contrast or focus values is typically some form of high pass filter (such as FIR or IIR), and can be in the simple case one dimensional (scan line based) or 2 dimensional (area based). Thereafter, the lens is moved through a plurality of focus zones and the contrast and focus values of all the focus zones are then calculated.

What is meant by focus zone in the context of the present application is the types of different positions that the lens can take which are measurably different by the still digital camera. The number of focus zones depends on the aperture of the lens, and the length of the lens.

For a wide angle lens with small aperture, the depth of field is so great that everything from 1 foot to infinity may be in one focus zone. The next focus zone would be from 1 foot to some closer point, possibly 1 inch. A telephoto lens, on the other hand, may focus from 25 feet to infinity as the first zone. The next zone may be from 20 to 25 feet. As the lens becomes closer to the scene, the zones become more and more shallow. For any given lens, zoom position and aperture, the focus zones can be computed. A completely open aperture will maximize the number of zones, and therefore enable the maximum detail on focus distance to be extracted from the scene.

Figure 5:
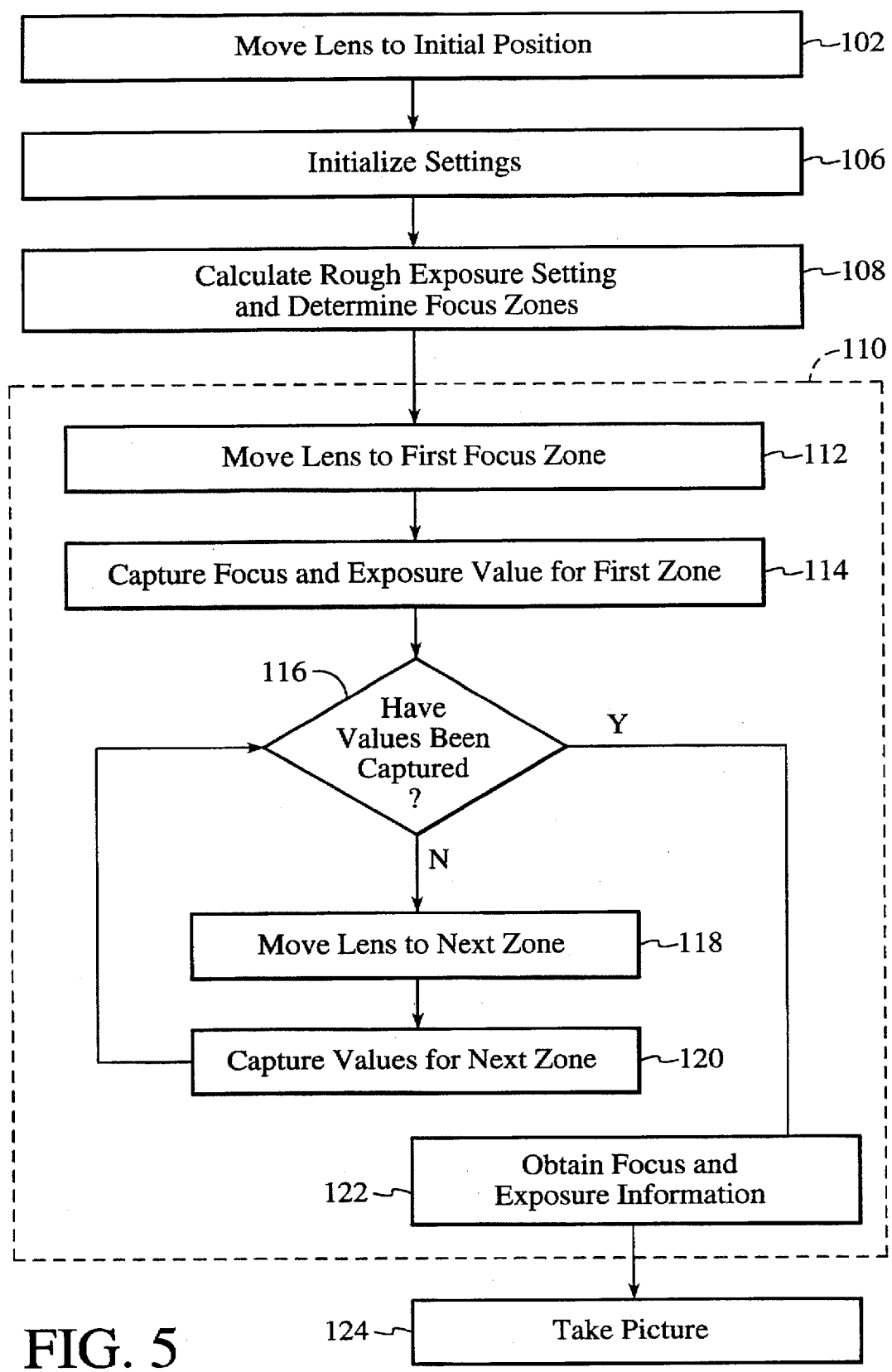
FIGS. 5, 5A and 5B are flow charts showing the operation of the automatic focusing system for a still digital camera in accordance with the present invention.

To more fully explain the present invention, refer now to a flow chart of FIG. 5 showing the operation thereof in conjunction with FIGS. 1, 2, and 3. In this embodiment for a given scene, the motors 46 of the still digital camera 14 move the lens 23 to an initial focus and exposure position via step 102. At this point, the aperture of the lens is fully open.

Next, a plurality of initial focus and exposure settings are determined, via step 106. In the next step 108, based on the iris setting, the zoom position (lens focal length), the rough exposure and required focus zones are determined. The rough exposure is close enough to allow proper collection of focus data.

Figure 5A:
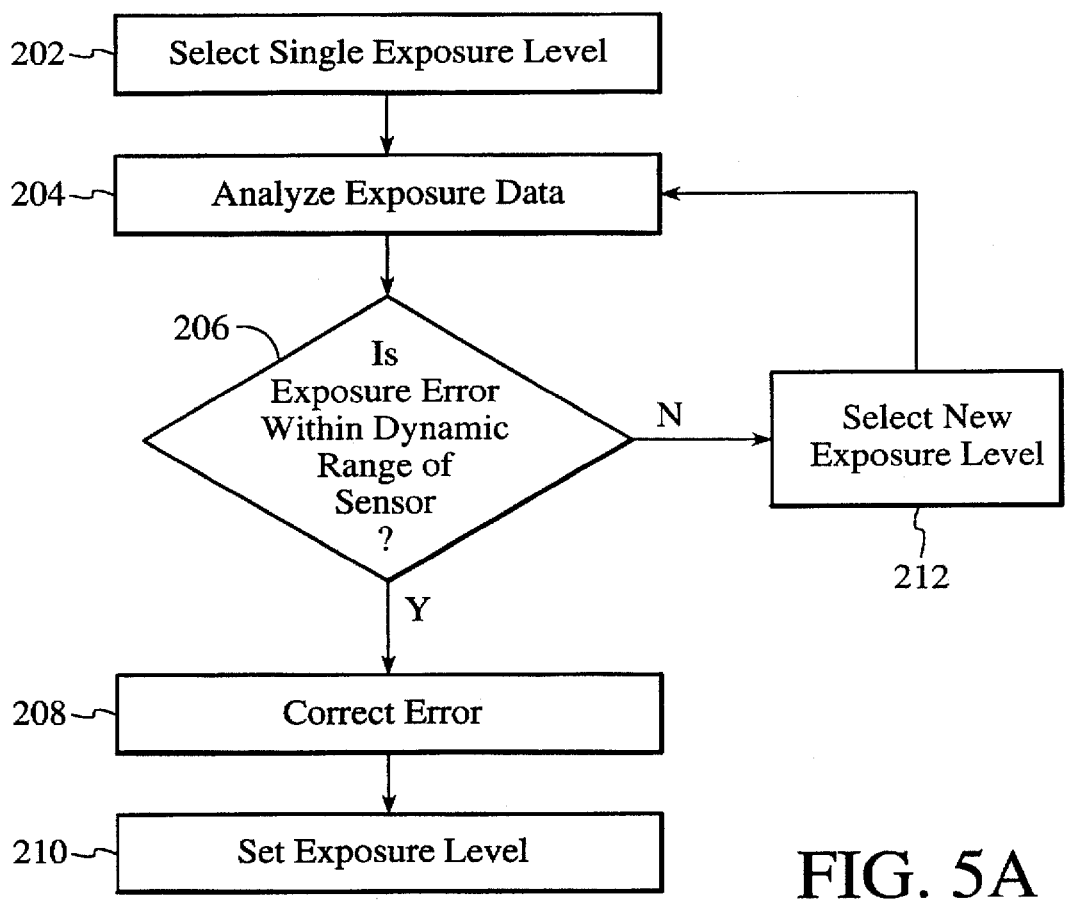

Referring now to FIG. 5A, the rough exposure in a preferred embodiment is determined in the following manner. A single exposure is selected midway between the lowest light level and highest light level the camera supports via step 202.

The exposure data collected from the signal Processing unit 16 of FIG. 1 (96 blocks in the preferred embodiment) is analyzed via step 204. If the data indicates the exposure error is known, via step 206 (light levels were well within the dynamic range of the sensor), the exposure is corrected in a single step, via step 208. If the data indicates the light was too low or too high (outside the dynamic range of the sensor), another exposure at a lower or higher level is attempted, via step 212. Typically, this second step is the last required.

The data at this point should be within the range where the correct exposure can be calculated (within the dynamic range of the sensor). At this point, the exposure is set via step 210. This requires adjustment of the iris, sensor exposure time, and potentially, in low light situations, increase gain in the ASP stage. The iris is only reduced in extremely bright situations to lengthen the exposure time, where the sensor will not perform well at a very short exposure time (smear from highlights in the image).

Now that the iris setting is known, and assuming the lens focal length is known (either because the lens is a fixed focal length lens, or because the zoom motor position is known), the required focus zones can be calculated. This calculation is well known and understood in optical science.

Referring back to FIG. 5, at this point, a scan of all the focus zones can be performed via step 110 to obtain the relevant focus information of the scene.

Figure 5B:
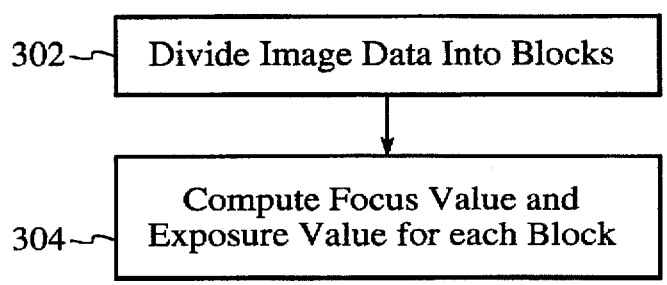

Accordingly, during the focus zone scan step 110, after the rough exposure values and focus zones for the image are obtained, the lens is again moved via a motor under computer 20 control to a first focus zone via step 112 and the focus values for the first focus zone are captured via step 114. Referring now to FIG. 5B, this is accomplished by first dividing up the image data into blocks via step 302, and then computing focus values and exposure values (RGB) for each block via step 304.

Referring again back to FIG. 5, then a determination is made whether all the focus values from all the focus zones have been captured, via step 116. If all the information has not been captured, then the lens is moved to the next focus zone, via step 118. Then the focus values are captured for the next focus zone via step 120. Thereafter step 110 is reentered to determine if all focus zone values have been captured, via step 116. Steps 116–120 are repeated until all of the focus values are obtained by the camera in all of the focus zones via step 122. After all the information has been captured, the captured information can be utilized to take a picture via step 124. Through this system within a digital still camera, a three-dimensional like data set of the scene can be determined. For example, it can be determined for each rectangle in the image, where the maximum focus value is located. Thus, in the example of two people standing in front of a wall, there will be a large number of focus values indicating the approximate distance to the people (within the accuracy of the focus zones) and another set of rectangles—in the area of the wall—indicating the approximate distance to the wall.

A scene analysis program can be applied to this data to determine the best approach to focus. A simple example would be to first try to get everything into focus at once. This may not be possible, if the aperture must be wide to get enough ambient light to take a picture, or to get enough light from a flash. In this case, the focus can be set for the closer objects, since they are large in area. A finer scan of the desired focus area can be made using a higher frequency setting on the focus filters, and doing a secondary scan around the selected distance to refine the focus setting.

This entire process can proceed very quickly, if the camera is properly designed. Rather than capturing the entire image for each zone, the still digital camera can be clocked to skip over (dump) scan lines. For example, ¼ of the lines could be used to generate the required focus and exposure values. For a typical video-rate sensor, this would allow capture of 120 fields per second. The lens could be quickly moved from one end of its focus range to the other at this rate and focus scan could be completed in a few hundred milliseconds—depending on the lens and motors.

In addition to providing superior focus, in most situations, to the simpler approaches currently popular in 35 mm cameras, the data can also provide information for the auto exposure system, as well. In the above example, it is clear what part of the image is the subject. The exposure values for the selected subjects can be used to determine the correct, refined exposure, rather than using the rough exposure, which included exposure information from the wall.

If the wall, for example, has a vertical blind in front of a window, and it is daytime outside, this additional information will enable the camera to increase exposure for the relatively dark people against the brightly lit background. In addition, since information is available about the distances to the background and the foreground subjects, flash calculations can be done automatically, if insufficient light is available on the primary subjects. Note that this ability to assist in setting exposure is very significant, since CCDs do not have the dynamic range of film, and therefore are much more susceptible to exposure errors.

Although the present invention has been described in the context of a still camera, it should also be understood that a system in accordance with the present invention could be utilized with a video camera or the like with a live view finder. With live viewfinder, having the video camera system operate in accordance with the present invention can be troublesome for the viewer, if a system in accordance with the present invention was utilized as the primary focus arrangement for the video. In such a system, every time a scene change was detected, the focus arrangement would be retriggered constantly which would be distracting to the user. To eliminate this distraction, a separate lens and sensor could be utilized to perform the autofocusing, or a partially silvered mirror could be added to the main lens assembly to reflect some light into a secondary movable lens and smaller sensor. The secondary movable lens is used to perform the autofocusing of the present invention without changing the current focus setting of the main lens assembly.

Accordingly, a system and method is provided within a camera system for providing an automatically focused image. Through this system more information can be obtained to provide for more accurate image information.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined by the appended claims.

I claim:

1. A method for automatically focusing an image within a still camera, the still camera including a lens, the method comprising the steps of:
   (a) providing initial focus and exposure values of the image, the initial focus and exposure values providing step (a) further comprising the step of (a1) setting an exposure time of the still camera to a midrange value and an analog gain value of the still camera to unity;
   (b) calculating an exposure setting for the image;
   (c) determining a plurality of focus zones for the image based on an aperture and length of the lens; and
   (d) moving the lens through the plurality of focus zones of the image to obtain exposure and focus information concerning the image.

2. The method of claim 1 which includes the step of (e) capturing the exposure and focus information of the image to provide a picture.

3. The method of claim 1 in which the capturing step (e) further comprises the step of (e1) dividing the image into a plurality of rectangles.

4. The method of claim 1, in which the calculating step (b) comprises the step of adjusting the exposure time and gain to provide a proper exposure range.

5. The method of claim 4, in which the moving step (d) further comprises the steps of:
   (d1) moving the lens to a first focus zone;
   (d2) capturing the focus and exposure values for the first focus zone;
   (d3) determining if all of the focus and exposure values have been captured;
      if all of the focus and exposure values have not been captured,
         (d31) moving the lens to a next focus zone;
         (d32) capturing the focus and exposure values for the next focus zone and return to step (d3),
      if all the focus and exposure values have been captured;
         (d33) obtaining exposure and focus information concerning the image.

6. A system for automatically focusing an image within a still camera, the still camera including a lens, the system comprising:
   means for providing initial focus and exposure values of the image in which the providing means further comprises means for setting an exposure time of the still camera to a midrange value and an analog gain value of the still camera to unity;
   means responsive to the initial focus and exposure value providing means for calculating an exposure setting for the image;
   means responsive to the initial focus and exposure value providing means for determining a plurality of focus zones for the image based on an aperture and length of the lens; and
   a processor means responsive to the exposure setting calculating means and the determining means for moving the lens through the plurality of focus zones of the image to obtain exposure and focus information concerning the image.

7. The system of claim 6, which includes means responsive to the motor means for capturing the exposure and focus information of the image to provide a picture.

8. The system of claim 6, in which capturing means further comprises means for dividing the image into a plurality of rectangles.

9. The system of claim 6, in which the calculating means comprises means for adjusting the exposure time and gain to provide a proper exposure range.

10. The system of claim 9, in which the processor means comprises:

a computer; and a motor coupled to the processor and the lens.

11. The system of claim 9, in which the motor responsive to the computer moves the lens appropriately through the plurality of focus zones; captures the focus and exposure values for the plurality of focus zones; determines if all of the focus and exposure values have been captured; and obtains exposure and focus information concerning the image.

* * * * *